Patented May 5, 1942

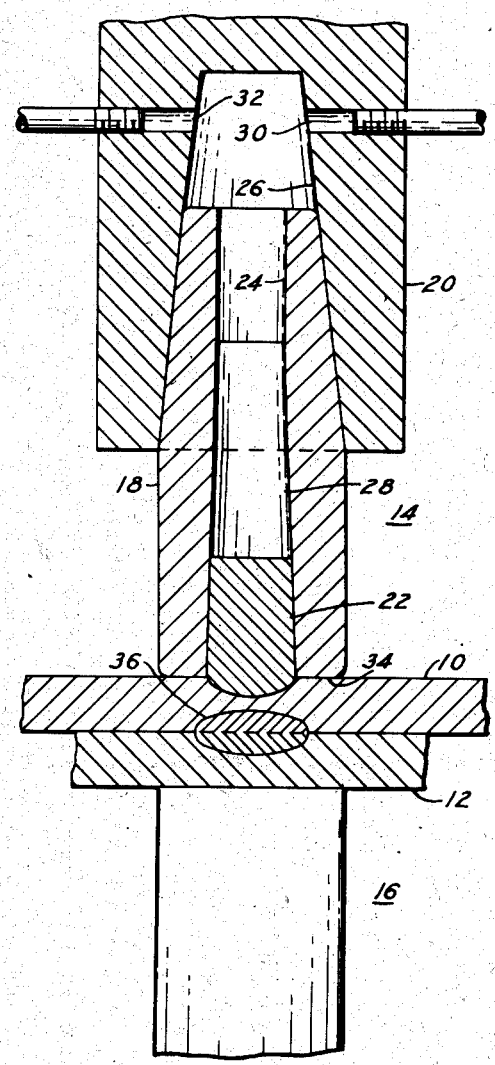

2,282,186

UNITED STATES PATENT OFFICE 2,282,186

RESISTANCE WELDING ELECTRODE AND METHOD

Philip E. Henninger, Pittsburgh, Pa., assignor to Westinghouse Electric & Manufacturing Company, East Pittsburgh, Pa., a corporation of Pennsylvania Application March 2, 1940, Serial No. 321,877

5 Claims. (Cl. 219—4)

My invention relates, generally, to resistance welding, and it has reference, in particular, to resistance welding electrodes and a method of resistance welding therewith.

Generally stated, it is an object of my invention to provide a spot or resistance welding electrode of simple construction for securing improved welds of aluminum, aluminum alloys, and the like.

More specifically, it is an object of my invention to provide a composite resistance welding electrode having a high resistance heat producing tip surrounded by a shield in the form of a body member of high conductivity having a relatively large end surface for engaging a member on which a welding operation is to be performed subsequent to its engagement of the tip.

Another object of my invention is to provide a spot welding electrode for welding aluminum, and the like, wherein a high resistance molybdenum tip member through which the welding current flows, initially engages one of the members to be welded to apply pressure thereto so as to produce the principal welding heat and penetrate the member, and a surrounding body member of relatively high conductivity associated with the high resistance electrode member subsequently engages the said member to effect a transfer of the current flow and pressure thereto from the high resistance tip member to prevent further penetration of the high resistance electrode member.

A further object of my invention is to provide a composite spot welding electrode wherein a relatively high resistance electrode tip is positioned in a hollow body member having a passage therein for cooling fluid and a relatively large end surface from which the electrode member projects.

Still another object of the invention is to provide a simple and effective method for the resistance welding of metals such as aluminum, and the like, which fuse rapidly upon reaching the melting point.

Yet another object of the invention is to provide for applying pressure and external heat to the weld zone of a member of aluminum, or the like, which is to be resistance welded by passing an electric current through a relatively high resistance electrode engaging the member and, subsequently transferring the pressure and current flow to an area surrounding the weld by means of a shield of relatively large area and relatively low resistance surrounding the high resistance electrode so as to limit the surface penetration of the member being welded.

Other objects will, in part, be obvious, and will, in part, appear hereinafter.

In practicing my invention, a resistance welding electrode, which is of particular importance in welding parts of aluminum and the like which fuse rapidly upon reaching the melting point, may be provided by positioning an electrode tip composed of a relatively high resistance heat-producing material as molybdenum, in an opening at the end of a metallic body member of relatively high conductivity, so as to project slightly therefrom. The end surface of the body member is preferably of a relatively large area with respect to the area of a cross section of the high resistance tip. Heat and pressure may be initially applied to the member engaged by the high resistance tip by passing an electric current therethrough, and upon predetermined penetration thereof into the member, the flow of current and the pressure may be transferred therefrom to the surrounding end portion of the body member, so as to reduce the welding heat and limit the penetration of the high resistance tip into the member being welded.

Referring to the single figure of the accompanying drawing, which is a side elevational view in section of resistance welding apparatus embodying the principal features of my invention, the reference numerals 10 and 12 may denote members of aluminum or the like which are to be resistance or spot welded together. The members may be positioned between the electrode members 14 and 16 of resistance welding apparatus of any suitable type well-known in the art.

The resistance welding electrode 14 may, for example, comprise a body member 18 which may be positioned in a suitable electrode holder 20, and a high resistance tip or member 22 projecting from the lower end of the body member.

The body member 18 may be secured in the electrode holder 20 in any suitable manner, being for example, provided with a tapered end portion 24 adjacent the upper end thereof, which may be positioned in a correspondingly tapered recess 26 in the electrode holder. A central opening 28 may be provided longitudinally through the body member 18 so as to permit the circulation therethrough of a suitable cooling fluid, which may be admitted to the recess 26 of the electrode holder by means of suitable passages 30 and 32 to which cooling fluid conduits may may be connected. In accordance with my invention, the body member 18 may be of a material having relatively high electrical conductivity and relatively high mechanical strength, such for example, as one of the high strength copper alloys known to the metal trade. The area of the end surface 34 of the body member should be relatively large with respect to the area of the opening 28 therethrough.

In order to apply external heat to the member 10, the high resistance electrode tip 22 may be positioned in the lower end of the opening 28 of the body member 18 of the electrode so that the cooling fluid encounters the upper end thereof. The electrode tip 22 may be secured therein in any suitable manner, being for example, slightly tapered so as to interfit tightly with correspondingly tapered side walls at the lower end of the opening. The electrode tip 22 may be of any suitable high resistance material capable of withstanding extremely high temperatures and pressure such as encountered in resistance spot welding operations. In this respect, excellent results have been obtained by using an electrode tip of molybdenum, which may be formed by compressing finely divided particles of molybdenum under high pressure, and sintering to form an integral mass.

The electrode tip 22 projects slightly from the surrounding end surface 34 of the body member 18, the amount of the projection depending to some degree on the thickness of the members 10 and 12 which are to be resistance welded. For example, when welding aluminum members having a thickness of from $\frac{1}{16}$" to $\frac{1}{2}$", I have found that a projection of about $\frac{1}{16}$" produces highly satisfactory results. For welding members having a lesser or greater thickness the amount of the projection may be varied accordingly.

In accordance with my invention, the members 10 and 12 which are to be resistance welded may be positioned between the electrode members 14 and 16, which may be connected to any suitable source of welding current. Since neither the source of welding current, the control thereof, nor the welding apparatus, in general, form any part of this invention, they have been omitted from the drawing, it being understood that my invention may be used with any suitable form of welding apparatus, source of welding currents, and control therefor.

Pressure may be applied to the welding electrodes in any suitable manner to bring them into engagement with the members 10 and 12, respectively, whereupon they may be connected, by means of control means of any type well-known in the art, to a source of welding current. As the relatively high resistance molybdenum electrode tip 22 is the only part of the electrode 14 initially engaging the member 10, the total welding pressure is applied to the member thereby, and the entire flow of welding current is passed therethrough. Since the electrode tip 22 is of relatively high resistance, a large amount of heat will be produced therein so as to apply heat externally to the member 10. Upon the fusion of the member 10 at the point of contact of the electrode tip 22 therewith, since the electrode tip 22 engages the member 10 under pressure, it continues to develop heat and penetrates into the member 10.

After a predetermined penetration of the electrode tip 22 into the member 10, the surrounding end portion 34 of the body member 18 engages the surrounding surface of the member 10 about the zone of the weld 36 between the members 10 and 12, which is represented by the area hatched in dotted lines. Since the area of the end surface 34 is relatively large with respect to the cross sectional area of the electrode tip 22, and is also of a relatively high conductivity material, the path of the welding current transfers from the relatively high resistance tip 22 to the relatively low resistance of the body member 18. The amount of heat produced at the weld zone by the passage of the welding current through the electrode tip 22 is thereby greatly reduced, and a limited amount of heat is produced in the members in the area surrounding the weld zone. At the same time, the mechanical pressure initially exerted by the relatively high resistance electrode tip or member 22 on the member 10 at the weld zone is transferred to the surrounding end surface 34 of the body member 18, whereby suitable pressure is maintained between the members 10 and 12 which are being resistance welded, over a relatively large area surrounding the zone of the weld, so as to insure the proper alignment of the members and permit the metal in the weld zone to properly unite the members.

From the above description, and the accompanying drawing, it will be apparent that by my invention I have provided a simple and effective manner for resistance welding members of aluminum, or the like, wherein fusion takes place almost instantaneously when the melting point thereof is reached. By utilizing a spot or resistance welding electrode embodying the features of my invention, welds may be readily made between the aluminum members or the like of relatively great thickness, which are sound, and of high strength. Accurate control of the welding current when welding aluminum sections after the manner of my invention is unnecessary, and in some instances current durations of as long as 33 cycles have been used, the resultant welds being highly satisfactory in every respect.

Since certain changes may be made in the above description, and different embodiments of the invention may be made without departing from the spirit thereof, it is intended that all the matter contained in the above description, or shown in the accompanying drawing, shall be considered as illustrative and not in a limiting sense.

I claim as my invention:

1. A spot welding electrode comprising, a body member of relatively high conductivity having an opening therethrough from the lower end to provide a passage for a cooling fluid and a relatively large substantially flat contact surface at the lower end, and a contact tip of molybdenum positioned in the opening with one end exposed to the cooling fluid and having the other end projecting from the contact surface of the body member which provides a shield a predetermined distance from the projecting end of the tip for engaging a relatively large area of a member being welded to prevent excessive penetration of the tip into the member being welded.

2. A composite spot welding electrode comprising, a heat producing tip of sintered molybdenum, and a body member of a copper alloy of relatively high conductivity having an axial opening therethrough to provide a passage for a cooling fluid and receive the tip, said body member having a relatively large flat end surface positioned a predetermined distance from the end of the tip for engaging a member being welded to provide a conductive shield from which the tip projects.

3. A method of electric resistance welding members of relatively high conductivity which fuse relatively suddenly upon reaching the melting point which comprises the steps of applying a relatively large amount of external heat to a relatively small area of at least one of the members at the weld zone by passing an electric current through a relatively high resistance electrode engaging said one member so as to fuse the metal of the said member, forcing the electrode tip into the said member under pressure, and abruptly limiting the penetration of the high resistance electrode tip and suddenly limiting the current flow therethrough by utilizing a relatively low resistance conductive shield having a relatively large area surrounding the electrode to engage the member after a predetermined penetration of the electrode tip.

4. A method of resistance welding members which consists in initially applying current and pressure to a relatively small area of the members to be welded by means of electrodes at least one of which has a high resistance tip of relatively small area, and subsequently abruptly transferring the flow of current and the pressure from the high resistance tip to a surrounding relatively large area low resistance portion of said one electrode to limit the penetration of the said tip.

5. A method of electric resistance welding members which consists in applying a relatively large amount of external heat and pressure to a weld zone of limited area on at least one of the members being welded by passing an electric current through a relatively high resistance electrode of relatively small area engaging said one member, and suddenly transferring the flow of current and the pressure to an extended area surrounding the zone of the weld after a predetermined penetration of the high resistance electrode.

PHILIP E. HENNINGER.